United States Patent
Kirby et al.

(10) Patent No.: US 8,273,470 B2
(45) Date of Patent: *Sep. 25, 2012

(54) ENVIRONMENTAL BARRIER COATINGS PROVIDING CMAS MITIGATION CAPABILITY FOR CERAMIC SUBSTRATE COMPONENTS

(75) Inventors: Glen Harold Kirby, Liberty Township, OH (US); Brett Allen Boutwell, West Chester, OH (US); John Frederick Ackerman, Laramie, WY (US)

(73) Assignee: General Electric Company, Schenectady, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/340,126

(22) Filed: Dec. 19, 2008

(65) Prior Publication Data

US 2010/0159261 A1    Jun. 24, 2010

(51) Int. Cl.
*B32B 15/04* (2006.01)

(52) U.S. Cl. ........ 428/701; 428/457; 428/446; 428/448; 428/451; 428/452; 428/640; 428/471; 416/214 R; 416/241 B

(58) Field of Classification Search .................. None
See application file for complete search history.

(56) References Cited

U.S. PATENT DOCUMENTS

| | | | |
|---|---|---|---|
| 5,057,627 A * | 10/1991 | Edwards | 568/618 |
| 5,851,678 A | 12/1998 | Hasz et al. | |
| 6,159,553 A | 12/2000 | Li | |
| 6,296,941 B1 | 10/2001 | Eaton | |
| 6,312,763 B1 | 11/2001 | Eaton | |
| 6,602,814 B1 | 8/2003 | Gadow et al. | |
| 6,617,037 B2 | 9/2003 | Sun | |
| 6,699,607 B1 * | 3/2004 | Spitsberg | 428/702 |
| 6,759,151 B1 | 7/2004 | Lee | |
| 7,001,679 B2 | 2/2006 | Campbell | |
| 7,115,326 B2 * | 10/2006 | Spitsberg et al. | 428/697 |
| 7,226,672 B2 * | 6/2007 | Litton et al. | 428/701 |
| 7,298,077 B2 * | 11/2007 | Justel et al. | 313/486 |
| 7,354,651 B2 | 4/2008 | Hazel | |
| 7,357,994 B2 | 4/2008 | Hazel | |
| 7,374,818 B2 | 5/2008 | Bhatia | |
| 2002/0181513 A1 * | 12/2002 | Laurell et al. | 372/11 |
| 2003/0027012 A1 | 2/2003 | Spitsberg et al. | |
| 2003/0035907 A1 | 2/2003 | Campbell et al. | |
| 2003/0049500 A1 * | 3/2003 | Takai et al. | 428/702 |

(Continued)

FOREIGN PATENT DOCUMENTS

EP    1683773 A2    7/2006

(Continued)

OTHER PUBLICATIONS

Park et. al. J. Am. Ceram. Soc. 86 (4) 603-611, 2003.*

(Continued)

*Primary Examiner* — Jennifer McNeil
*Assistant Examiner* — Vera Katz
(74) *Attorney, Agent, or Firm* — William Scott Andes; Gary M. Hartman; Domenica N. S. Hartman

(57) ABSTRACT

Environmental barrier coatings having CMAS mitigation capability for silicon-containing components. In one embodiment, the barrier coating includes a bond coat layer comprising aluminide-alumina TGO; and an outer layer selected from the group consisting of $AeAl_2O_{19}$, $AeHfO_3$, $AeZrO_3$, $ZnAl_2O_4$, $MgAl_2O_4$, $Ln_4Al_2O_9$, $Lna_4Ga_2O_9$, $Ln_3Al_5O_{12}$, $Ln_3Ga_5O_{12}$, $Ga_2O_3$, $HfO_2$, and $LnPO_4$.

9 Claims, 1 Drawing Sheet

U.S. PATENT DOCUMENTS

| | | | |
|---|---|---|---|
| 2003/0103875 A1* | 6/2003 | Campbell et al. | 422/177 |
| 2003/0207155 A1* | 11/2003 | Morrison et al. | 428/699 |
| 2004/0175597 A1* | 9/2004 | Litton et al. | 428/702 |
| 2005/0074625 A1 | 4/2005 | Meschter | |
| 2006/0166018 A1* | 7/2006 | Spitsberg et al. | 428/471 |
| 2006/0210800 A1* | 9/2006 | Spitsberg et al. | 428/408 |
| 2006/0280952 A1 | 12/2006 | Hazel et al. | |
| 2006/0280954 A1 | 12/2006 | Spitsberg et al. | |
| 2006/0280955 A1 | 12/2006 | Spitsberg | |
| 2006/0280963 A1 | 12/2006 | Hazel et al. | |
| 2008/0044662 A1 | 2/2008 | Schlichting | |
| 2008/0044686 A1 | 2/2008 | Schlichting | |
| 2008/0057326 A1 | 3/2008 | Schlichting | |
| 2008/0113217 A1 | 5/2008 | Maloney | |
| 2008/0113218 A1 | 5/2008 | Schlichting | |
| 2009/0004427 A1 | 1/2009 | Sarrafi-Nour | |
| 2009/0162561 A1* | 6/2009 | Kirby et al. | 427/452 |
| 2009/0162632 A1* | 6/2009 | Kirby et al. | 428/304.4 |
| 2009/0184280 A1* | 7/2009 | Lee | 252/62 |
| 2010/0158680 A1* | 6/2010 | Kirby et al. | 415/200 |

FOREIGN PATENT DOCUMENTS

| | | |
|---|---|---|
| WO | 03026886 A2 | 4/2003 |

OTHER PUBLICATIONS

International Search Report issued in connection with corresponding PCT Application No. PCT/US2009/067843 on Feb. 9, 2010.
International Search Report issued in connection with corresponding PCT Application No. PCT/US2009/067852 on Feb. 12, 2010.
International Search Report issued in connection with corresponding PCT Application No. PCT/US2009/067857 on Feb. 10, 2010.

* cited by examiner

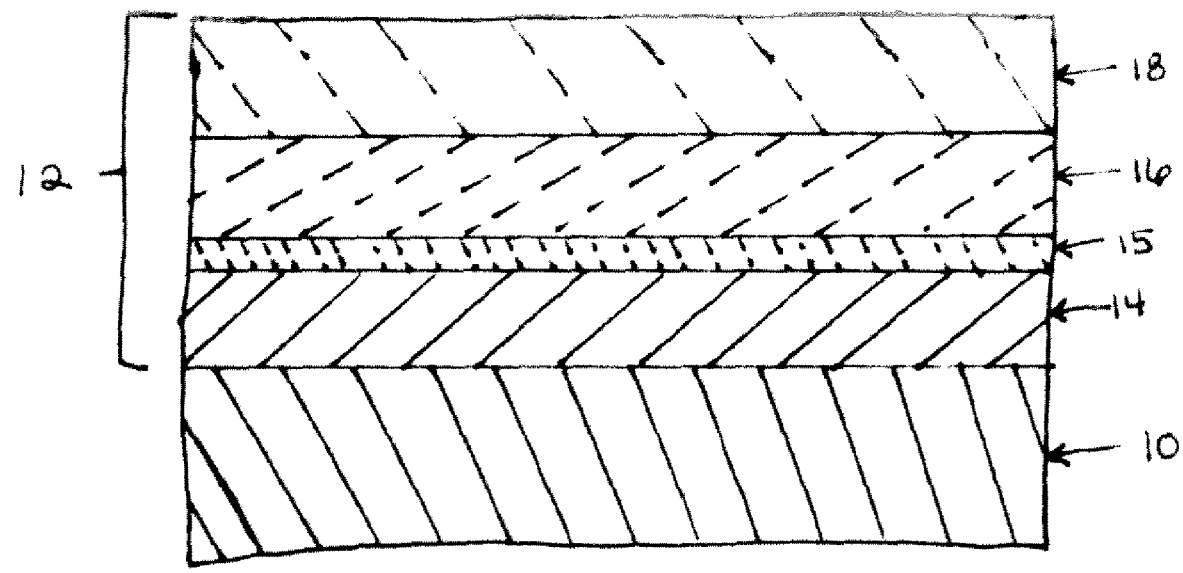

ENVIRONMENTAL BARRIER COATINGS PROVIDING CMAS MITIGATION CAPABILITY FOR CERAMIC SUBSTRATE COMPONENTS

TECHNICAL FIELD

Embodiments described herein generally relate to environmental barrier coatings (EBCS) providing CMAS mitigation capability for use with ceramic substrate components.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight substrate materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. Using these ceramic materials can decrease the weight, yet maintain the strength and durability, of turbine components. Furthermore, since these materials have higher temperature capability than metals, significant cooling air savings can be realized that increase the efficiency of a turbine engine. Therefore, such materials are currently being considered for many gas turbine components used in higher temperature sections of gas turbine engines, such as airfoils (e.g. turbines, and vanes), combustors, shrouds and other like components that would benefit from the lighter-weight and higher temperature capability these materials can offer.

CMC and monolithic ceramic components can be coated with EBCs to protect them from the harsh environment of high temperature engine sections. EBCs can provide a dense, hermetic seal against the corrosive gases in the hot combustion environment. In dry, high temperature environments, silicon-based (nonoxide) CMCs and monolithic ceramics undergo oxidation to form a protective silicon oxide scale. However, the silicon oxide reacts rapidly with high temperature steam, such as found in gas turbine engines, to form volatile silicon species. This oxidation/volatilization process can result in significant material loss, or recession, over the lifetime of an engine component. This recession also occurs in CMC and monolithic ceramic components comprising aluminum oxide, as aluminum oxide reacts with high temperature steam to form volatile aluminum species as well.

Currently, most EBCs used for CMC and monolithic ceramic components consist of a three-layer coating system generally including a bond coat layer, at least one transition layer applied to the bond coat layer, and an optional outer layer applied to the transition layer. Optionally, a silica layer may be present between the bond coat layer and the adjacent transition layer. Together these layers can provide environmental protection for the CMC or monolithic ceramic component.

More specifically, the bond coat layer may comprise silicon and may generally have a thickness of from about 0.5 mils to about 6 mils. For silicon-based nonoxide CMCs and monolithic ceramics, the bond coat layer serves as an oxidation barrier to prevent oxidation of the substrate. The silica layer may be applied to the bond coat layer, or alternately, may be formed naturally or intentionally on the bond coat layer. The transition layer may typically comprise mullite, barium strontium aluminosilicate (BSAS), a rare earth disilicate, and various combinations thereof, while the optional outer layer may comprise BSAS, a rare earth monosilicate, and combinations thereof. There may be from 1 to 3 transition layers present, each layer having a thickness of from about 0.1 mils to about 6 mils, and the optional outer layer may have a thickness of from about 0.1 mils to about 40 mils.

Each of the transition and outer layers can have differing porosity. At a porosity of about 10% or less, a hermetic seal to the hot gases in the combustion environment can form. From about 10% to about 40% porosity, the layer can display mechanical integrity, but hot gases can penetrate through the coating layer damaging the underlying EBC. While it is necessary for at least one of the transition layer or outer layer to be hermetic, it can be beneficial to have some layers of higher porosity range to mitigate mechanical stress induced by any thermal expansion mismatch between the coating materials and the substrate.

Unfortunately, deposits of calcium magnesium aluminosilicate (CMAS) have been observed to form on components located within higher temperature sections of gas turbine engines, particularly in combustor and turbine sections. These CMAS deposits have been shown to have a detrimental effect on the life of thermal barrier coatings, and it is known that BSAS and CMAS chemically interact at high temperatures, i.e. above the melting point of CMAS (approximately 1150° C. to 1650° C.). It is also known that the reaction byproducts formed by the interaction of BSAS and CMAS are detrimental to EBCs as well as being susceptible to volatilization in the presence of steam at high temperatures. Such volatilization can result in the loss of coating material and protection for the underlying component. Thus, it is expected that the presence of CMAS will interact with the EBC, thereby jeopardizing the performance of the component along with component life.

Accordingly, there remains a need for novel environmental barrier coatings that provide CMAS mitigation capability for use in conjunction with ceramic substrate components.

BRIEF DESCRIPTION OF THE INVENTION

Embodiments herein generally relate to environmental barrier coatings having CMAS mitigation capability for silicon-containing components, the barrier coating comprising: a bond coat layer comprising aluminide-alumina TGO; and an outer layer selected from the group consisting of $AeAl2O19$, $AeHfO3$, $AeZrO3$, $ZnAl2O4$, $MgAl2O4$, $Ln4Al2O9$, $Lna4Ga2O9$, $Ln3Al5O12$, $Ln3Ga5O12$, $Ga2O3$, $HfO2$, and $LnPO4$.

Embodiments herein also generally relate to environmental barrier coatings having CMAS mitigation capability for silicon-containing components, the barrier coating comprising: a bond coat layer comprising aluminide-alumina TGO; a transition layer comprising $AeAl2O19$; and an outer layer comprising $AeAl4O7$.

Embodiments herein also generally relate to environmental barrier coatings having CMAS mitigation capability for silicon-containing components, the barrier coating comprising: a bond coat layer comprising aluminide-alumina TGO; a transition layer comprising BSAS; and an outer layer selected from the group consisting of ZnAl2O4, MgAl2O4, Ln2Si2O7, HfO2, LnPO4, and Ln2SiO5.

Embodiments herein also generally relate to environmental barrier coatings having CMAS mitigation capability for silicon-containing CMC components, the barrier coating comprising: a bond coat comprising aluminide-alumina TGO; a transition layer comprising HfO2 or YPO4; and an outer layer selected from the group consisting of AeAl2O19, AeHfO3, AeZrO3, ZnAl2O4, MgAl2O4, Ln4Al2O9, Lna4Ga2O9, Ln3Al5O12, Ln3Ga5O12, Ln2Si2O7, Ln2SiO5 and Ga2O3.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

FIG. 1 is a schematic cross sectional view of one embodiment of an environmental barrier coating providing CMAS mitigation in accordance with the description herein.

DETAILED DESCRIPTION OF THE INVENTION

Embodiments described herein generally relate to EBCs providing CMAS mitigation capability for ceramic substrate components.

The environmental barrier coatings having CMAS mitigation capability described herein may be suitable for use in conjunction with substrates comprising CMCs, and monolithic ceramics. As used herein, "CMCs" refers to silicon-containing, or oxide-oxide, matrix and reinforcing materials. Some examples of silicon-containing CMCs acceptable for use herein can include, but should not be limited to, materials having a matrix and reinforcing fibers comprising non-oxide silicon-based materials such as silicon carbide, silicon nitride, silicon oxycarbides, silicon oxynitrides, and mixtures thereof Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. These oxide-oxide composites are described below.

Specifically, the "oxide-oxide CMCs" may be comprised of a matrix and reinforcing fibers comprising oxide-based materials such as aluminum oxide ($Al_2O_3$), silicon dioxide ($SiO_2$), aluminosilicates, and mixtures thereof Aluminosilicates can include crystalline materials such as mullite ($3Al_2O_3 \cdot 2SiO_2$), as well as glassy aluminosilicates.

As used herein, "monolithic ceramics" refers to materials comprising only silicon carbide, only silicon nitride, only alumina, or only mullite. Herein, CMCs and monolithic ceramics are collectively referred to as "ceramics."

As used herein, the term "barrier coating(s)" refers to environmental barrier coatings (EBCs). The barrier coatings herein may be suitable for use on ceramic substrate components 10 found in high temperature environments, such as those present in gas turbine engines. "Substrate component" or simply "component" refers to a component made from "ceramics," as defined herein.

More specifically, as explained herein below, EBC 12 may comprise an optional bond coat layer 14, an optional silica layer 15, optionally at least one transition layer 16, and an outer layer 18, as shown generally in FIG. 1. The bond coat layer 14 may comprise silicon, silicide, aluminide, or aluminide with a thermally grown aluminide oxide scale (henceforth "aluminide-alumina TGO"). By "thermally grown" it is meant that the intermetallic aluminide layer is applied to the CMC, then an aluminum oxide layer forms on top of the deposited aluminide layer after subsequent thermal exposure. As used herein "silicide" may include, but is not limited to, niobium disilicide, molybdenum disilicide, rare earth (Ln) silicides, noble metal silicides, chromium silicide (e.g. $CrSi_3$), niobium silicide (e.g. $NbSi_2$, $NbSi_3$), molybdenum silicide (e.g. $MoSi_2$, $MoSi_3$), tantalum silicide (e.g. $TaSi_2$, $TaSi_3$), titanium silicide (e.g. $TiSi_2$, $TiSi_3$), tungsten silicide (e.g. $WSi_2$, $W_5Si_3$), zirconium silicide (e.g. $ZrSi_2$), hafnium silicide (e.g. $HfSi_2$).

As used herein, "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof, while "Lna" refers to the rare earth elements of lanthanum (La), cerium (Ce), praseodymium (Pr), neodymium (Nd), promethium (Pm), samarium (Sm), europium (Eu), gadolinium (Gd), and mixtures thereof.

More particularly, as used herein, "rare earth silicides" may include scandium silicide (e.g. $ScSi_2$, $Sc_5Si_3$, $Sc_3Si_5$, $ScSi$, $Sc_3Si_4$), yttrium silicide (e.g. $YSi_2$, $Y_5Si_3$, $Y_3Si_5$, $YSi$, $Y_3Si_4$), lanthanum silicide (e.g. $LaSi_2$, $La_5Si_3$, $La_3Si_5$, $LaSi$, $La_3Si_4$), cerium silicide (e.g. $CeSi_2$, $Ce_5Si_3$, $Ce_3Si_5$, $CeSi$, $Ce_3Si_4$), praseodymium silicide (e.g. $PrSi_2$, $Pr_5Si_3$, $Pr_3Si_5$, $PrSi$, $Pr_3Si_4$), neodymium silicide (e.g. $NdSi_2$, $Nd_5Si_3$, $Nd_3Si_5$, $NdSi$, $Nd_3Si_4$), promethium silicide (e.g. $PmSi_2$, $Pm_5Si_3$, $Pm_3Si_5$, $PmSi$, $Pm_3Si_4$), samarium silicide (e.g. $SmSi_2$, $Sm_5Si_3$, $Sm_3Si_5$, $SmSi$, $Sm_3Si_4$), europium silicide (e.g. $EuSi_2$, $Eu_5Si_3$, $Eu_3Si_5$, $EuSi$, $Eu_3Si_4$, $Eu_3Si_4$), gadolinium silicide (e.g. $GdSi_2$, $Gd_5Si_3$, $Gd_3Si_5$, $GdSi$, $Gd_3Si_4$), terbium silicide (e.g. $TbSi_2$, $Tb_5Si_3$, $Tb_3Si_5$, $TbSi$, $Tb_3Si_4$), dysprosium silicide ($DySi_2$, $Dy_5Si_3$, $Dy_3Si_5$, $DySi$, $Dy_3Si_4$), holmium silicide (e.g. $HoSi_2$, $Ho_5Si_3$, $Ho_3Si_5$, $HoSi$, $Ho_3Si_4$), erbium silicide ($ErSi_2$, $Er_5Si_3$, $Er_3Si_5$, $ErSi$, $Er_3Si_4$), thulium silicide ($TmSi_2$, $Tm_5Si_3$, $Tm_3Si_5$, $TmSi$, $Tm_3Si_4$), ytterbium silicide (e.g. $YbSi_2$, $Yb_5Si_3$, $Yb_3Si_5$, $YbSi$, $Yb_3Si_4$), lutetium silicide (e.g. $LuSi_2$, $Lu_5Si_3$, $Lu_3Si_5$, $LuSi$, $Lu_3Si_4$), and mixtures thereof. It should be noted that only non-oxide, silicon-based monolithic ceramics and composites require a bond coat.

Also, as used herein throughout, "aluminides" may include, but should not be limited to, ruthenium aluminide, platinum aluminide, nickel aluminide, titanium aluminide, or mixtures thereof.

When a silicon-containing component is selected, the bond coat layer 14 may comprise any of a silicon bond coat layer, a silicide bond coat layer, or an aluminide-alumina TGO bond coat layer, each of which is described herein below. As used herein throughout, "silicon-containing component" includes silicon-containing CMCs, monolithic silicon carbide ceramics and monolithic silicon nitride ceramics.

In one embodiment, a silicon-containing component may have a silicon bond coat layer 14. In this instance, the EBC may comprise one of the following architectures: a silicon bond coat layer 14, an optional silica layer 15, and a $Ln_4Al_2O_9$ outer layer 18; a silicon bond coat layer 14, an optional silica layer 15, and a $Lna_4Ga_2O_9$ outer layer 18; a silicon bond coat layer 14, an optional silica layer 15, a $HfO_2$ transition layer 16, and a $Ln_4Al_2O_9$ outer layer 18; a silicon bond coat layer 14, an optional silica layer 15, a $HfO_2$ transition layer 16, and a $Ln_4Ga_2O_9$ outer layer 18; a silicon bond coat layer 14, an optional silica layer 15, a $LnPO_4$ transition layer 16, and a $Ln_2SiO_5$ outer layer 18; a silicon bond coat layer 14, an optional silica layer 15, a $LnPO_4$ transition layer 16, and a $Ln_2Si_2O_7$ outer layer 18; a silicon bond coat layer 14, an optional silica layer 15, a $LnPO_4$ transition layer 16, and a $Ln_4Al_2O_9$ outer layer 18; a silicon bond coat layer 14, an optional silica layer 15, a $LnPO_4$ transition layer 16, and a $Ln_4Ga_2O_9$ outer layer 18; a silicon bond coat layer 14, an optional silica layer 15, a $Ln_4Al_2O_9$ transition layer 16, and a $Ln_2SiO_5$ outer layer 18; a silicon bond coat layer 14, an optional silica layer 15, a $Lna_4Ga_2O_9$ transition layer 16, and a $Ln_2SiO_5$ outer layer 18; a silicon bond coat layer 14, an optional silica layer 15, a $LnPO4$ transition layer 16, and a $Ln_2SiO_5$ outer layer 18; a silicon bond coat layer 14, an optional silica layer 15, a $Ln_4Al_2O_9$ transition layer 16, and a $AeZrO_3$ outer layer 18; a silicon bond coat layer 14, an optional silica layer 15, a $Ln_4Al_2O_9$ transition layer 16, and a $HfO_2$ outer layer 18; a silicon bond coat layer 14, an optional silica layer 15, a $Ln_4Al_2O_9$ transition layer 16, and a $LnPO_4$ outer layer 18; a silicon bond coat layer 14, an optional silica layer 15, a $Lna_4Ga_2O_9$ transition layer 16, and a $HfO_2$ outer layer 18; a silicon bond coat layer 14, an optional silica layer 15, a $Lna_4Ga_2O_9$ transition layer 16, and a $LnPO_4$ outer layer 18; a silicon bond coat layer 14, an optional silica layer 15, a $Ln_4Al_2O_9$ transition layer 16, and a $AeHfO_3$ outer layer 18; a silicon bond coat layer 14, an optional silica layer 15, a $Lna_4Ga_2O_9$ transition layer 16, and a $AeZrO_3$ outer layer 18; a silicon bond coat layer 14, an optional silica layer 15, a $Lna_4Ga_2O_9$ transition layer 16, and a $AeHfO_3$ outer layer 18; a silicon bond coat layer 14, an optional silica layer 15, a $HfO_2$ transition layer 16, and a $AeZrO_3$ outer layer 18; a silicon bond coat layer 14, an optional silica layer 15, a $HfO_2$ transition layer 16, and a $AeHfO_3$ outer layer 18; a silicon bond coat layer 14, an optional silica layer 15, a $LnPO_4$ transition layer 16, and a $AeZrO_3$ outer layer 18; a silicon bond coat layer 14, an optional silica layer 15, a $LnPO_4$ transition layer 16, and a $AeHfO_3$ outer layer 18; a silicon bond coat layer 14, an optional silica layer 15, a $HfO_2$ transition layer 16, and a $ZnAl_2O_4$ outer layer 18; a silicon bond coat layer 14, an optional silica layer 15, a $LnPO_4$ transition layer 16, and a $ZnAl_2O_4$ outer layer 18; a silicon bond coat layer 14, an optional silica layer 15, a $Ln_4Al_2O_9$ transition layer 16, and a $ZnAl_2O_4$ outer layer 18; a silicon bond coat layer 14, an optional silica layer 15, a $Lna_4Ga_2O_9$ transition layer 16, and a $ZnAl_2O_4$ outer layer 18; a silicon bond coat layer 14, an optional silica layer 15, a $HfO_2$ transition layer 16, and a $MgAl_2O_4$ outer layer 18; a silicon bond coat layer 14, an optional silica layer 15, a $LnPO_4$ transition layer 16, and a $MgAl_2O_4$ outer layer 18; a silicon bond coat layer 14, an optional silica layer 15, a $Ln_4Al_2O_9$ transition layer 16, and a $MgAl_2O_4$ outer layer 18; a silicon bond coat layer 14, an optional silica layer 15, a $Lna_4Ga_2O_9$ transition layer, and a $MgAl_2O_4$ outer layer; a silicon bond coat layer 14, an optional silica layer 15, a $Ln_2Si_2O_7$ first transition layer, a $Ln_2SiO_5$ second transition layer, and a $Ln_3Ga_5O_{12}$ outer layer; a silicon bond coat layer 14, an optional silica layer 15, a $HfO_2$ transition layer, and a $Ln_3Ga_5O_{12}$ outer layer; a silicon bond coat layer 14, an optional silica layer 15, a $LnPO_4$ transition layer, and a $Ln_3Ga_5O_{12}$ outer layer; a silicon bond coat layer 14, an optional silica layer 15, a $Ln_4Al_2O_9$ transition layer, and a $Ln_3Ga_5O_{12}$ outer layer; a silicon bond coat layer 14, an optional silica layer 15, a $Lna_4Ga_2O_9$ transition layer and a $Ln_3Ga_5O_{12}$ outer layer; a silicon bond coat layer 14, an optional silica layer 15, a $Ln_2Si_2O_7$ first transition layer, a $Ln_2SiO_5$ second transition layer, and a $Ln_3Al_5O_{12}$ outer layer; a silicon bond coat layer 14, an optional silica layer 15, a $HfO_2$ transition layer, and a $Ln_3Al_5O_{12}$ outer layer; a silicon bond coat layer 14, an optional silica layer 15, a $LnPO_4$ transition layer, and a $Ln_3Al_5O_{12}$ outer layer; a silicon bond coat layer 14, an optional silica layer 15, a $Ln_4Al_2O_9$ transition layer, and a $Ln_3Al_5O_{12}$ outer layer; a silicon bond coat layer 14, an optional silica layer 15, a $Lna_4Ga_2O_9$ transition layer, and a $Ln_3Al_5O_{12}$ outer layer; a silicon bond coat layer 14, an optional silica layer 15, a $HfO_2$ transition layer, and a $AeAl_{12}O_{19}$ outer layer; a silicon bond coat layer 14, an optional silica layer 15, a $LnPO_4$ transition layer, and a $AeAl_{12}O_{19}$ outer layer; a silicon bond coat layer 14, an optional silica layer 15, a $Ln_4Al_2O_9$ transition layer, and a $AeAl_{12}O_{19}$ outer layer; a silicon bond coat layer 14, an optional silica layer 15, a $Lna_4Ga_2O_9$ transition layer, and a $AeAl_{12}O_{19}$ outer layer; a silicon bond coat layer 14, an optional silica layer 15, a $HfO_2$ transition layer, a $AeAl_{12}O_{19}$ transition layer, and a $AeAl_4O_7$ outer layer; a silicon bond coat layer 14, an optional silica layer 15, a $LnPO_4$ first transition layer, a $AeAl_{12}O_{19}$ second transition layer, and a $AeAl_4O_7$ outer layer; a silicon bond coat layer 14, an optional silica layer 15, a $Ln_4Al_2O_9$ first transition layer, a $AeAl_{12}O_{19}$ second transition layer, and a $AeAl_4O_7$ outer layer; a silicon bond coat layer 14, an optional silica layer 15, a $Lna_4Ga_2O_9$ first transition layer 16, a $AeAl_{12}O_{19}$ second transition layer 16, and a $AeAl_4O_7$ outer layer 18; a silicon bond coat layer 14, an optional silica layer 15, a $HfO_2$ transition layer 16, and a $Ga_2O_3$ outer layer 18; a silicon bond coat layer 14, an optional silica layer 15, a $LnPO_4$ transition layer 16, and a $Ga_2O_3$ outer layer 18; a silicon bond coat layer 14, an optional silica layer 15, a $Ln_4Al_2O_9$ transition layer 16, and a $Ga_2O_3$ outer layer 18; a silicon bond coat layer 14, an optional silica layer 15, a $Lna_4Ga_2O_9$ transition layer 16, and a $Ga_2O_3$ outer layer 18; a silicon bond coat layer 14, an optional silica layer 15, a $Ln_4Al_2O_9$ transition layer 16, and a BSAS outer layer 18; a silicon bond coat layer 14, an optional silica layer 15, a $Ln_4Ga_2O_9$ transition layer 16, and a BSAS outer layer 18; a silicon bond coat layer 14, an optional silica layer 15, a $Ln_4Al_2O_9$ first transition layer 16, a BSAS second transition layer 16, and a $ZnAl_2O_4$ outer layer 18; a silicon bond coat layer 14, an optional silica layer 15, a $Ln_4Ga_2O_9$ first transition layer 16, a BSAS second transition layer 16, and a $ZnAl_2O_4$ outer layer 18; a silicon bond coat layer 14, an optional silica layer 15, a $Ln_4Al_2O_9$ first transition layer 16, a BSAS second transition layer 16, and a $MgAl_2O_4$ outer layer 18; a silicon bond coat layer 14, an optional silica layer 15, a $Ln_4Ga_2O_9$ first transition layer 16, a BSAS second transition layer 16, and a $MgAl_2O_4$ outer layer 18. As used herein, "Ae" represents the alkaline earth elements of magnesium (Mg), calcium (Ca), strontium (Sr), barium (Ba), and mixtures thereof As used herein, "mullite/BSAS mixture" refers to a mixture comprising from about 1% to about 99% mullite and from about 1% to about 99% BSAS.

Similarly, in another embodiment, a silicon-containing component may comprise a silicide bond coat layer 14. In this instance, the EBC may comprise any of the previously listed architectures with the exception that the silicon bond coat layer is replaced with a silicide bond coat layer. In addition, when using a silicide bond coat layer 14, the EBC may comprise on of the following architectures: a silicide bond coat layer 14, an optional silica layer 15, a $Ln_2Si_2O_7$ first transition layer 16, a BSAS second transition layer 16, and a $ZnAl_2O_4$ outer layer 18; a silicide bond coat layer 14, an optional silica layer 15, a $Ln_2Si_2O_7$ transition layer 16, and a $Ln_4Ga_2O_9$ outer layer 18; a silicide bond coat layer 14, an optional silica layer 15, a $Ln_2Si_2O_7$ transition layer 16, and a $Ln_3Ga_5O_{12}$ outer layer 18.

Alternately, in another embodiment, a silicon-containing component may comprise an aluminide-alumina TGO bond coat layer 14. In this embodiment, the EBC does not need a silica layer and may comprise one of the following architectures: an aluminide-alumina TGO bond coat layer 14 and a $AeAl_2O_{19}$ outer layer 18; an aluminide-alumina TGO bond coat layer 14 and an $HfO_2$ outer layer; an aluminide-alumina TGO bond coat layer 14 and a $LnPO_4$ outer layer; an aluminide-alumina TGO bond coat layer 14, $AeAl_2O_{19}$ transition layer 16, and a $AeAl_4O_7$ outer layer 18; an aluminide-alumina TGO bond coat layer 14 and a $AeHfO_3$ outer layer 18; an aluminide-alumina TGO bond coat layer 14 and a $AeZrO_3$ outer layer 18; an aluminide-alumina TGO bond coat layer 14 and a $ZnAl_2O_4$ outer layer 18; an aluminide-alumina TGO bond coat layer 14 and a $MgAl_2O_4$ outer layer 18; an aluminide-alumina TGO bond coat layer 14 and a $Ln_4Al_2O_9$ outer layer 18; an aluminide-alumina TGO bond coat layer 14, and a $Lna_4Ga_2O_9$ outer layer 18; an aluminide-alumina TGO bond coat layer 14, and a $Ln_3Al_5O_{12}$ outer layer 18; an aluminide-alumina TGO bond coat layer 14, and a $Ln_3Ga_5O_{12}$ outer layer 18; an aluminide-alumina TGO bond coat layer 14, and a $Ga_2O_3$ outer layer 18; an aluminide-alumina TGO bond coat layer 14, a BSAS transition layer 16, and a $ZnAl_2O_4$ outer layer 18; or an aluminide-alumina TGO bond coat layer 14, a BSAS transition layer 16, and a $MgAl_2O_4$ outer layer 18; an aluminide-alumina TGO bond coat layer 14, a BSAS transition layer 16, and a $Ln_2Si_2O_7$ outer layer 18; an aluminide-alumina TGO bond coat layer 14, a BSAS transition layer 16, and a $HfO_2$ outer layer 18; an aluminide-alumina TGO bond coat layer 14, a BSAS transition layer 16, and a $LnPO_4$ outer layer 18; an aluminide-alumina TGO bond coat layer 14, a BSAS transition layer 16, and a $Ln_2SiO_5$ outer layer 18; an aluminide-alumina TGO bond coat layer 14, a $HfO_2$ transition layer 16, and a $AeAl_2O_{19}$ outer layer 18; an aluminide-alumina TGO bond coat layer 14, a $HfO_2$ transition layer 16, and a $AeHfO_3$ outer layer 18; an aluminide-alumina TGO bond coat layer 14, a $HfO_2$ transition layer 16, and a $AeZrO_3$ outer layer 18; an aluminide-alumina TGO bond coat layer 14, a $HfO_2$ transition layer 16, and a $ZnAl_2O_4$ outer layer 18; an aluminide-alumina TGO bond coat layer 14, a $HfO_2$ transition layer 16, and a $MgAl_2O_4$ outer layer 18; an aluminide-alumina TGO bond coat layer 14, a $HfO_2$ transition layer 16, and a $Ln_4Al_2O_9$ outer layer 18; an aluminide-alumina TGO bond coat layer 14, a $HfO_2$ transition layer 16, and a $Lna_4Ga_2O_9$ outer layer 19; an aluminide-alumina TGO bond coat layer 14, a $HfO_2$ transition layer 16, and a $Ln_3Al_5O_{12}$ outer layer 18; an aluminide-alumina TGO bond coat layer 14, a $HfO_2$ transition layer 16, and a $Ln_3Ga_5O_{12}$ outer layer 18; an aluminide-alumina TGO bond coat layer 14, a $HfO_2$ transition layer 16, and a $Ln_2Si_2O_7$ outer layer 18; an aluminide-alumina TGO bond coat layer 14, a $HfO_2$ transition layer 16, and a $Ln_2SiO_5$ outer layer 18; an aluminide-alumina TGO bond coat layer 14, a $HfO_2$ transition layer 16, and a $Ga_2O_3$ outer layer 18; an aluminide-alumina TGO bond coat layer 14, a $YPO_4$ transition layer 16, and a $AeAl_2O_{19}$ outer layer 18; an aluminide-alumina TGO bond coat layer 14, a $YPO_4$ transition layer 16, and a $AeHfO_3$ outer layer 18; an aluminide-alumina TGO bond coat layer 14, a $YPO_4$ transition layer 16, and a $AeZrO_3$ outer layer 18; an aluminide-alumina TGO bond coat layer 14, a $YPO_4$ transition layer 16, and a $ZnAl_2O_4$ outer layer 18; an aluminide-alumina TGO bond coat layer 14, a $YPO_4$ transition layer 16, and a $MgAl_2O_4$ outer layer 18; an aluminide-alumina TGO bond coat layer 14, a $YPO_4$ transition layer 16, and a $Ln_4Al_2O_9$ outer layer 18; an aluminide-alumina TGO bond coat layer 14, a $YPO_4$ transition layer 16, and a $Lna_4Ga_2O_9$ outer layer 19; an aluminide-alumina TGO bond coat layer 14, a $YPO_4$ transition layer 16, and a $Ln_3Al_5O_{12}$ outer layer 18; an aluminide-alumina TGO bond coat layer 14, a $YPO_4$ transition layer 16, and a $Ln_3Ga_5O_{12}$ outer layer 18; an aluminide-alumina TGO bond coat layer 14, a $YPO_4$ transition layer 16, and a $Ln_2Si_2O_7$ outer layer 18; an aluminide-alumina TGO bond coat layer 14, a $YPO_4$ transition layer 16, and a $Ln_2SiO_5$ outer layer 18; an aluminide-alumina TGO bond coat layer 14, a $YPO_4$ transition layer 16, and a $Ga_2O_3$ outer layer 18.

In embodiments utilizing an oxide component, neither a bond coat, nor a silica layer, is needed. As used herein throughout, "oxide component" includes oxide-oxide CMCs, monolithic alumina ceramics, and monolithic mullite ceramics. The following EBC architectures are thus possible for oxide components: a $AeAl_2O_{19}$ outer layer 18; an $AeAl_2O_{19}$ transition layer 16 and a $AeAl_4O_7$ outer layer 18; a $AeHfO_3$ outer layer 18; a $AeZrO_3$ outer layer 18; a $ZnAl_2O_4$ outer layer 18; a $MgAl_2O_4$ outer layer 18; a $Ln_4Al_2O_9$ outer layer 18; a $Lna_4Ga_2O_9$ outer layer 18; a $Ln_3Al_5O_{12}$ outer layer 18; a $Ln_3Ga_5O_{12}$ outer layer 18; a $Ga_2O_3$ outer layer 18; a BSAS transition layer 16 and a $ZnAl_2O_4$ outer layer 18; a BSAS transition layer 16 and a $MgAl_2O_4$ outer layer 18; a BSAS transition layer 16, and a $Ln_2Si_2O_7$ outer layer 18; a BSAS transition layer 16, and a $LnPO_4$ outer layer 18; a BSAS transition layer 16, and a $Ln_2SiO_5$ outer layer 18; a $HfO_2$ transition layer 16, and a $AeAl_2O_{19}$ outer layer 18; a $HfO_2$ transition layer 16, and a $AeHfO_3$ outer layer 18; a $HfO_2$ transition layer 16, and a $AeZrO_3$ outer layer 18; a $HfO_2$ transition layer 16, and a $ZnAl_2O_4$ outer layer 18; a $HfO_2$ transition layer 16, and a $MgAl_2O_4$ outer layer 18; a $HfO_2$ transition layer 16, and a $Ln_4Al_2O_9$ outer layer 18; a $HfO_2$ transition layer 16, and a $Lna_4Ga_2O_9$ outer layer 19; a $HfO_2$ transition layer 16, and a $Ln_3Al_5O_{12}$ outer layer 18; a $HfO_2$ transition layer 16, and a $Ln_3Ga_5O_{12}$ outer layer 18; a $HfO_2$ transition layer 16, and a $Ln_2Si_2O_7$ outer layer 18; a $HfO_2$ transition layer 16, and a $Ln_2SiO_5$ outer layer 18; a $HfO_2$ transition layer 16, and a $Ga_2O_3$ outer layer 18; a $YPO_4$ transition layer 16, and a $AeAl_2O_{19}$ outer layer 18; a $YPO_4$ transition layer 16, and a $AeHfO_3$ outer layer 18; a $YPO_4$ transition layer 16, and a $AeZrO_3$ outer layer 18; a $YPO_4$ transition layer 16, and a $ZnAl_2O_4$ outer layer 18; a $YPO_4$ transition layer 16, and a $MgAl_2O_4$ outer layer 18; a $YPO_4$ transition layer 16, and a $Ln_4Al_2O_9$ outer layer 18; a $YPO_4$ transition layer 16, and a $Lna_4Ga_2O_9$ outer layer 19; a $YPO_4$ transition layer 16, and a $Ln_3Al_5O_{12}$ outer layer 18; a $YPO_4$ transition layer 16, and a $Ln_3Ga_5O_{12}$ outer layer 18; a $YPO_4$ transition layer 16, and a $Ln_2Si_2O_7$ outer layer 18; a $YPO_4$ transition layer 16, and a $Ln_2SiO_5$ outer layer 18; a $YPO_4$ transition layer 16, and a $Ga_2O_3$ outer layer 18.

Together, the previously described EBC layers can provide CMAS mitigation capability to high temperature ceramic components such as those present in gas turbine engines such as combustor components, turbine blades, shrouds, nozzles, heat shields, and vanes, which are exposed to temperatures of about 3000 F (1649° C.) during routine engine operations.

Any bond coat layer 14, silica layer 15, transition layer 16, and outer layer 18 present may be made using conventional methods known to those skilled in the art. More particularly, and regardless of the particular architecture of the EBC having CMAS mitigation capability, the substrate component can be coated using conventional methods known to those skilled in the art, including, but not limited to, plasma spraying, high velocity plasma spraying, low pressure plasma spraying, solution plasma spraying, suspension plasma spraying, chemical vapor deposition (CVD), electron beam physical vapor deposition (EBPVD), sol-gel, sputtering, slurry processes such as dipping, spraying, tape-casting, rolling, and painting, and combinations of these methods. Once coated, the substrate component may be dried and sintered using either conventional methods, or unconventional methods such as microwave sintering, laser sintering or infrared sintering.

Regardless of the architecture of the EBC having CMAS mitigation capability, the benefits are the same. Namely, the inclusion of the present CMAS mitigation compositions can help prevent the EBC from degradation due to reaction with CMAS in high temperature engine environments. More particularly, these CMAS mitigation compositions can help prevent or slow the reaction of CMAS with the barrier coating that can form secondary phases that rapidly volatilize in steam. Additionally, the present CMAS mitigation compositions can help prevent or slow the penetration of CMAS through the barrier coating along the grain boundaries into a nonoxide, silicon-based substrate. Reaction of CMAS with substrates such as silicon nitrate and silicon carbide evolve nitrogen-containing and carbonaceous gases, respectively. Pressure from this gas evolution can result in blister formation within the EBC coating. These blisters can easily rupture and destroy the hermetic seal against water vapor provided by the EBC in the first instance.

The presence of the CMAS mitigation compositions described herein can help prevent or slow the attack of molten silicates on the EBC, thereby allowing the EBC to perform its function of sealing the ceramic component from corrosive attack in high temperature steam. Moreover, the CMAS mitigation compositions can help prevent recession of the ceramic component, and also any layers of the EBC that may be susceptible to steam recession if CMAS reacts with it, to form steam-volatile secondary phases. Dimensional changes of ceramic components due to steam recession can limit the life and/or functionality of the component in turbine engine applications. Thus, the CMAS mitigation compositions are important to allow the barrier coating to perform its functions; thereby allowing the ceramic component to function properly and for its intended time span. Additionally, any transition layers present can provide moderate to strong barriers to high temperature steam penetration. This can help reduce the occurrence of a reaction between the layers of the barrier coating. Multiple transition layers can be included to further help reduce the occurrence of interlayer reactions, which can arise after long-term thermal exposure of the barrier coating.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An environmental barrier coating having CMAS mitigation capability for silicon-containing components, the barrier coating comprising:
 a bond coat layer comprising aluminide-alumina TGO;
 a transition layer consisting of $AeAl_2O_{19}$; and
 an outer layer consisting of $AeAl_4O_7$;
 wherein the bond coat layer is between the transition layer and a silicon-containing component and the transition layer is between the bond coat layer and the outer layer.

2. The barrier coating of claim 1 wherein the aluminide is selected from the group consisting of ruthenium aluminide, platinum aluminide, nickel aluminide, titanium aluminide, and combinations thereof.

3. An environmental barrier coating having CMAS mitigation capability for silicon-containing components, the barrier coating comprising:
 a bond coat layer comprising aluminide-alumina TGO;
 a transition layer comprising BSAS; and
 an outermost layer selected from the group consisting of $ZnAl_2O_4$, $MgAl_2O_4$, $Ln_2Si_2O_7$, $LnPO_4$, and $Ln_2SiO_5$;
 wherein the bond coat layer is between the transition layer and a silicon-containing component and the transition layer is between the bond coat layer and the outermost layer.

4. The barrier coating of claim 3 wherein the aluminide is selected from the group consisting of ruthenium aluminide, platinum aluminide, nickel aluminide, titanium aluminide, and combinations thereof.

5. The barrier coating of claim 3, wherein the outermost layer consists of $ZnAl_2O_4$.

6. The barrier coating of claim 3, wherein the outermost layer consists of $MgAl_2O_4$.

7. The barrier coating of claim 3, wherein the outermost layer consists of $Ln_2Si_2O_7$.

8. The barrier coating of claim 3, wherein the outermost layer consists of $LnPO_4$.

9. The barrier coating of claim 3, wherein the outermost layer consists of $Ln_2SiO_5$.

* * * * *